(12) United States Patent
Lohmeier

(10) Patent No.: US 7,851,038 B2  
(45) Date of Patent: Dec. 14, 2010

(54) THREE-PART LAMINATED PLIABLE HAND-MOLDABLE SURFACE CONSTRUCTION

(76) Inventor: Kevin F. Lohmeier, 8064 Shanes Way, Roscoe, IL (US) 61073

( * ) Notice: Subject to any disclaimer, the term of this patent is extended or adjusted under 35 U.S.C. 154(b) by 1195 days.

(21) Appl. No.: 11/407,872

(22) Filed: Apr. 20, 2006

(65) Prior Publication Data

US 2007/0036937 A1 Feb. 15, 2007

Related U.S. Application Data

(60) Provisional application No. 60/673,008, filed on Apr. 20, 2005, provisional application No. 60/722,614, filed on Sep. 30, 2005, provisional application No. 60/692,523, filed on Jun. 21, 2005.

(51) Int. Cl.  
*B32B 15/06* (2006.01)

(52) U.S. Cl. ............... 428/35.9; 428/36.8; 250/515.1; 250/519.1; 141/331

(58) Field of Classification Search ............... 428/36.8, 428/35.7–35.9, 98; 250/515.1, 517.1, 519.1; 141/331

See application file for complete search history.

(56) References Cited

U.S. PATENT DOCUMENTS

| | | | | |
|---|---|---|---|---|
| 4,190,131 A | * | 2/1980 | Robinson | 428/36.8 |
| 4,442,585 A | * | 4/1984 | McGehee et al. | 138/149 |
| 4,467,577 A | * | 8/1984 | Licht | 428/138 |
| 5,245,195 A | * | 9/1993 | Shah et al. | 250/515.1 |
| 5,306,373 A | * | 4/1994 | Swan | 250/515.1 |
| 6,202,702 B1 | * | 3/2001 | Ohira et al. | 138/149 |
| 6,841,791 B2 | * | 1/2005 | DeMeo et al. | 250/515.1 |
| 7,193,230 B2 | * | 3/2007 | Lagace et al. | 250/515.1 |
| 7,196,023 B2 | * | 3/2007 | Langley et al. | 442/131 |

\* cited by examiner

*Primary Examiner*—Gregory L Huson  
*Assistant Examiner*—Nicolas A Arnett  
(74) *Attorney, Agent, or Firm*—Leydig, Voit & Mayer, Ltd.

(57) ABSTRACT

A three-part laminated surface construction can be shaped and molded by hand and will retain that shape until the particular need is met, such as controlling the flow of liquids and resins, or establishing a protective cover. The surface construction includes a center sheet of lead with rubber layers secured over the lead. The perimeter of the rubber layers are secured together. The lead sheet can be provided with outer flaps, one soft rubber side and the other rubber side abrasion-resistant for folding around and protection from sharp objects.

30 Claims, 7 Drawing Sheets

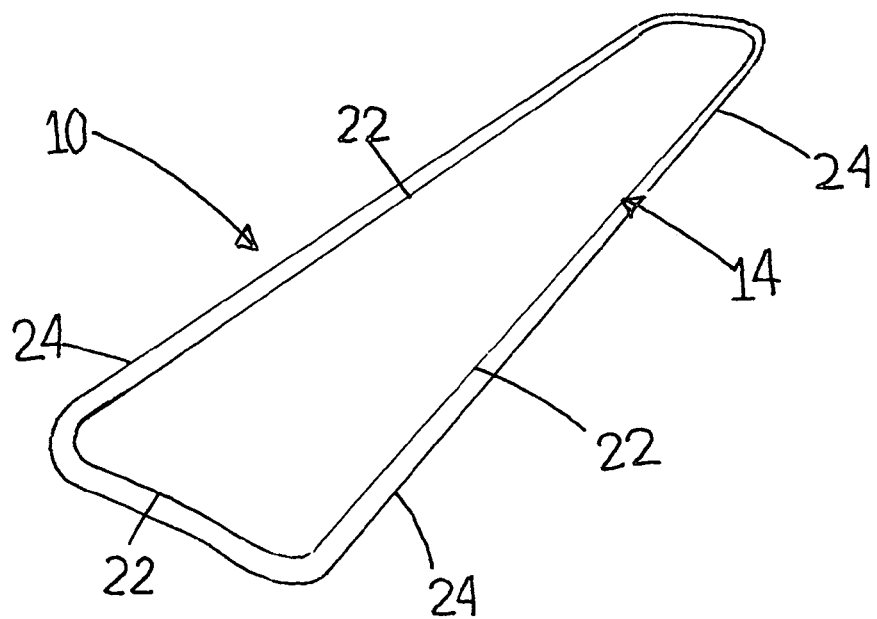
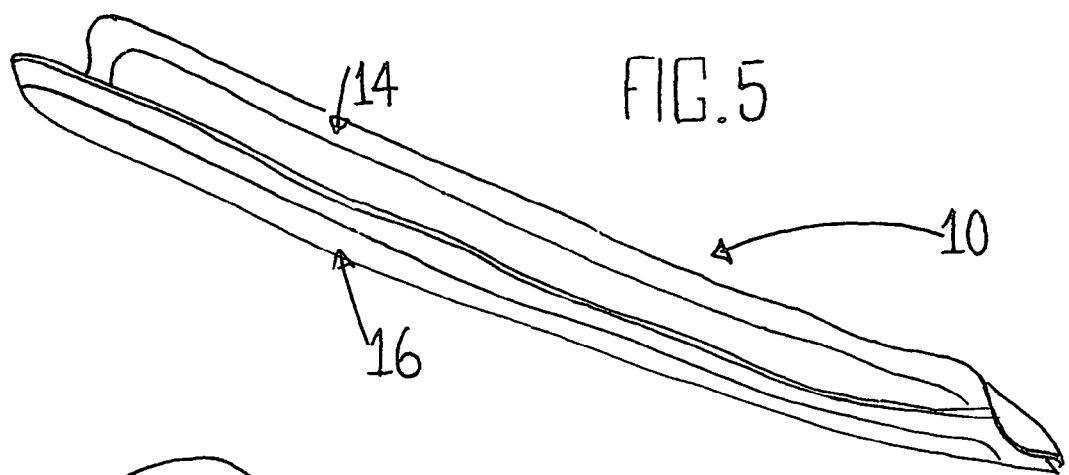
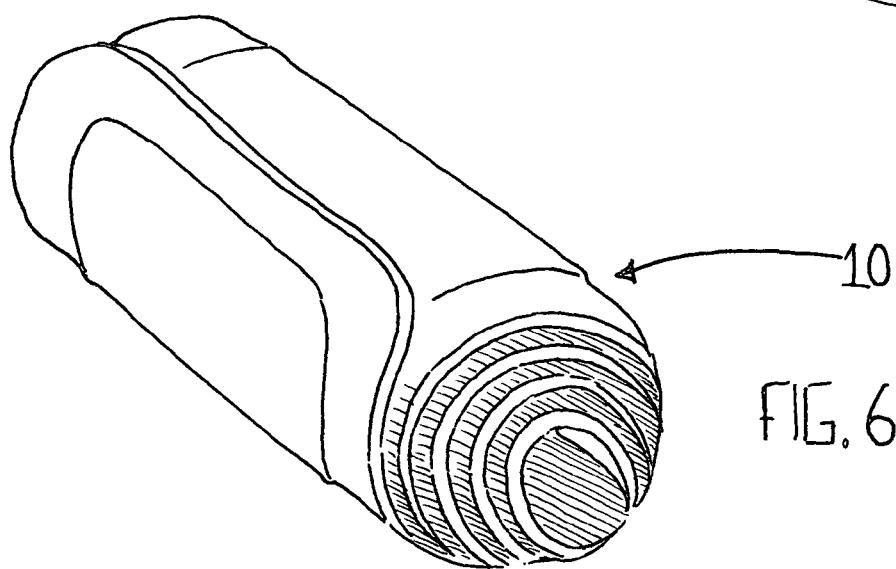

THREE-PART LAMINATED PLIABLE HAND-MOLDABLE SURFACE CONSTRUCTION

CROSS-REFERENCES TO RELATED APPLICATIONS

This application claims priority to U.S. Provisional Patent Application Ser. No. 60/673,008, filed Apr. 20, 2005, U.S. Provisional Patent Application Ser. No. 60/692,523, filed Jun. 21, 2005, and U.S. Provisional Patent Application Ser. No. 60/722,614, filed Sep. 30, 2005.

INCORPORATION-BY-REFERENCE OF MATERIAL SUBMITTED ON A COMPACT DISC

Not Applicable.

STATEMENT REGARDING FEDERALLY SPONSORED RESEARCH OR DEVELOPMENT

Not Applicable.

BACKGROUND OF THE INVENTION

1. Field of Invention

The present invention relates generally to a pliable hand-moldable surface construction.

More specifically, the invention relates to a three-part laminated pliable hand-moldable surface construction which, while suitable for other uses, is particularly useful for channeling the flow of liquids and resins such as for draining engine oil from hard to reach locations, and for covering sharp edges such as formed by cutting off parts of a vehicle for protecting rescue personnel from injury and their equipment from damage when extracting a person from the vehicle or otherwise working in proximity thereto. Accordingly, the invention relates to a three-part laminated pliable hand-moldable surface construction, a liquid channeling device comprising a three-part laminated pliable hand-moldable surface construction, and a protective cover comprising a three-part laminated pliable hand-moldable surface construction.

The invention accomplishes the foregoing in a pliable surface construction that can be shaped and molded by hand, and that will retain the shape into which it is molded to meet a particular need. Thereafter, the surface can be reshaped for convenience, to accomplish another task, or be flattened or rolled into a compact article for storage. The invention presents a continuous surface segment that is chemical and abrasion resistant, to enable establishing a flow channel between two or more locations, or a protective cover over dangerous articles. The surface construction can be hand molded in any way desired to provide the means to channel liquids or resins as efficiently as possible for the particular needs, or to obtain the desired protection from dangerous objects, and can even be cut into a desired size and shape for specific purposes.

2. Description of Prior Art

It can be appreciated that devices to drain oil from engines and other machines have been in use for many years. Conventional oil draining devices typically include plastic and galvanized funnels, drain pans, rubber hose and other preformed devices for is directing oil from an engine drain port to a second location for collection in a container. It will also be appreciated that other liquids such as circulating coolant are drained from an engine with similar devices, and that discussion herein to draining oil from an engine refers generally to channeling a flowable product from one location to another, and is therefore applicable to draining all types of liquids from many types of engines, transmissions, machines and other equipment, as well as to other flow or product channeling applications.

Use of conventional oil draining devices presents several drawbacks and disadvantages. Significant problems can result from such devices being fixed in configuration. It is not possible to easily change the shape of the device to provide a custom way to drain oil or direct the flow of fluid to accommodate custom needs such as dictated by unusual engine configurations and drain port locations. It is also not possible to easily change the sizes of conventional oil draining devices, other than perhaps cutting off the length of a rubber tube. Consequently, smaller and larger size devices must often be purchased to accommodate special size limitations of particular needs. Another disadvantage of conventional oil draining devices is that they often do not provide large surface flow area which would be convenient to collect and channel large volumes of fluid. Another problem with conventional oil draining devices is that they are typically bulky, and cannot be conveniently stored in a compact form or limited space location. Thus, while conventional oil draining devices may be suitable for the particular purpose to which they are intended to address, they are not easily adaptable for unusual circumstances, and their use can present difficulties in certain instances.

As one example, use of conventional oil draining devices can be a continuing problem in draining oil from certain aircraft engines where the oil filter is located in a difficult to reach place, and draining the oil during removal of the filter can result in discharge of oil on other parts of the engine, requiring additional, but otherwise unnecessary, cleanup and maintenance procedures It can also be appreciated that extrication pads have been in use for many years by fire and rescue personnel to protect against the dangers of exposed jagged edges on a disabled vehicle. Under certain conditions, after a vehicle has been in an accident, the top of the vehicle may have to be removed to gain access its interior and extract a person from the vehicle. Removal of the top results in exposed sharp edges where the post frame supporting the top is cut through by the rescue personnel. Additional exposed sharp edges may also be present on the vehicle as a result of the accident. Conventional extrication pads include rugs, rags, old fire hose and like materials that can be placed over such exposed jagged edges to protect personnel from injury and their equipment from damage.

Use of conventional extrication pads presents several drawbacks and disadvantages. The main problem with conventional extrication pads is that they do not mold in-place over exposed jagged edges, for example, the cut-through "A, B, C" top support posts of a vehicle from which a person needs to be removed. Conventional extrication pads placed over such jagged edges can be inadvertently shifted out of position, as when brushed by a person walking or moving by the post, exposing part of a jagged edge, or knocked entirely off of the end of the post. Another problem with conventional extrication pads is that they can not be easily decontaminated of bodily fluids such as with bleach and water, and therefore cannot typically or easily be reused. Another problem with conventional extrication pads is that they often cannot be conveniently stored on a rescue vehicle. Thus, conventional extrication pads are only marginally suitable for protecting rescue personnel from dangers presented by jagged edges such as formed by cutting off the top, or a door or even other parts of vehicles.

SUMMARY OF THE INVENTION

The invention comprises a three-part laminated pliable surface construction that can be molded by hand to a desired shape and size, and that will retain the shape and size into which it is molded until the particular need has been met. The surface construction presents a continuous chemical and abrasion resistant surface segment that can be advantageously utilized for numerous purposes and in alternate embodiments. After use, the surface construction can be reshaped to accomplish another task, or flattened or rolled into a compact article for storage.

A surface construction, in accordance with the invention, comprises three parts: a center lead sheet covered by two sheets of laminated rubber. The main structural part of the surface construction is the sheet of lead that is pliable and hand-moldable of an appropriate size and shape. Adhered onto and covering both sides of the lead sheet are the sheets of rubber. The lead sheet provides the functional and structural foundation for the pliable, hand-moldable and shape-retention characteristics of the surface construction. The rubber sheets protect the lead sheet, and provide insulative, caustic, abrasion resistance and other protection characteristics with regard to both personnel handling the surface construction and the material or environment with which the surface construction is used. The composition of the rubber sheets is therefore provided as appropriate for functional and protection purposes in consideration of the material or environment to which the surface construction is exposed. For instance neoprene rubber is suitable to withstand exposure to certain chemicals, while nitrile rubber is generally preferred for handling petroleum-based liquids. Those skilled in the material arts will recognize that other rubber compositions will be most suitable to achieve certain desired characteristics, such as abrasion resistance, softness or hardness, durability to repeated flexing and compression, and other material characteristics.

In accordance with one aspect of the invention, a new and unique draining and flow channeling surface construction is provided that accomplishes many of the tasks of conventional oil draining devices, but that is adaptable and easily changed in shape, size and flow area to accommodate custom needs, and that can be transported and stored in a convenient compact form. In these and other respects, the laminated surface construction substantially departs from the conventional concepts and designs of the prior conventional oil draining devices, and in so doing provides a device that is uniquely convenient for the purpose of controlling the flow of liquids and or resins of any composition by means of a laminated continuous surface construction that can be shaped and molded by hand and that will retain such shape until the particular need has been met.

In one embodiment, the surface construction is elongated, generally rectangular in overall shape (when laid flat) that can be rolled or laid flat for storage. The surface construction can be shaped into an elongated channel of a desired length that can curve and bend in three dimensions to permit channeling of liquid (e.g., draining of oil) along a relatively tortuous path as may be required as from a drain port to a channel outlet located safely away from an engine. The overall length of the channel can be adjusted by unrolling additional length of the surface construction and shaping it into the end of the channel.

Thus, a flow channeling device, in accordance with the invention, comprises a lamination of lead and rubber formed to establish a pliable surface construction that can be molded by hand to establish controlled flow between two locations, including to channel flow efficiently as possible for certain specialized circumstances, is chemically resistant to the fluid being handled, and that will retain the shape into which it is molded so until the draining or other channeling need is met. The surface construction presents a continuous, chemical resistant surface to carry the liquid or resin along the desired path, as well as to protect the user when handling the device. After use, the flow channeling device can be easily cleaned and reshaped (rolled, folded or flattened) for convenient storage, and then reused as required.

The laminated rubber-lead-rubber surface construction of the present invention provides several unique elements and results in several advantages when used to channel flow such as in a draining device as compared with prior draining devices. The surface construction can be hand shaped and molded into virtually any desired configuration to achieve custom flow channeling required for particular purposes. The surface construction can be shaped to achieve a relatively large surface area which can be especially convenient to collect and channel fluid where large volumes of liquid are involved or where there may be a some potential for spraying or splattering from the drain port. The operative length and/or overall size of the surface construction can be changed, to establish a smaller or larger, or shorter or longer flow channel to accommodate particular needs. The surface construction can also be cut on-site into an appropriate reduced size and/or shape, or shaped in other ways that will be desirable in providing a device to channel liquids as efficiently as possible for particular application. And as noted above, the surface construction can be conveniently stored as a flat sheet or in a roll, or folded or otherwise shaped for convenience thereof. In summary, the laminated rubber-lead-rubber surface construction of the present invention can be hand shaped, molded formed into virtually any desired configuration to achieve the draining and flow channeling required for particular purposes.

In accordance with another aspect of the invention, a new and unique protective cover is provided for protecting rescue personnel from the dangers associated with exposed jagged edges on a vehicle, such as may be formed by the cutting off of parts of vehicles and equipment to extricate a person from the vehicle, and other dangerous situations. The protective cover comprises a lamination of lead and rubber formed to establish a laminated pliable surface construction that can be molded by hand around an exposed edge, and that will retain the shape into which it is molded so that the cover is retained over the exposed object or edge until manually unshaped and removed. After use, the protective cover can be decontaminated and reshaped (rolled, folded or flattened) for convenient storage in a compact form, and then reused as required. The protective cover provides several unique elements and achieves several distinct advantages as compared with prior extrication pads. The protective cover can be provided in convenient sizes for ease of storage on fire and rescue vehicles, and ease of use by fire and rescue personnel. The protective cover can be hand shaped and molded over virtually any exposed edge for protection therefrom. In preferred embodiments, the protective cover is uniquely configured to be molded by hand over the end of a post and/or around a sharp object, and to retain its shape until removed from the post or other object. The invention can be used for numerous other purposes where a portable, reusable, moldable protective cover is desired. In these and other respects, the invention provides a protective cover that accomplishes the purposes of conventional extrication pads, but that substantially departs from the conventional concepts and designs of the prior art, and in so doing provides a device that is especially convenient for the purpose of covering, and thereby providing protection from exposed sharp objects and jagged edges, as often encountered by rescue personnel.

In one embodiment, the protective cover is generally rectangular in shape (when laid flat) as described above. In a preferred embodiment, the center layer of pliable, hand-moldable lead is formed with a center part and an outer part that includes an outer edge shape provided with slots or slits or other configured material voids to establish flaps or like configured parts such that the center part can be placed over the jagged exposed edge (e.g., the end of a post) and the flaps can be bent and folded around the exposed edges (e.g., around the wall of the post), such that the protective cover will retain its molded shape until manually reshaped and removed from the post. The center layer can be formed in many different shapes, such as the fire fighting symbol (the Maltese cross).

In a preferred protective surface construction, one side is a continuous, abrasion resistant rubber surface for placement against the jagged edge, and the other side is a softer exposed rubber surface to protect the fire and rescue personnel and their equipment. In this instance, a soft rubber sheet or lamination of composition appropriate to provide protection from handling of the lead sheet is laminated or adhered onto and covering one side of the lead sheet. This layer will be exposed outwardly when the protective cover is in place over a sharp object, and therefore is further of suitable composition to resiliently stretch as the protective cover is molded over (for example) the end of a post, to resiliently return to its unstretched condition when the cover is removed from the post and reshaped into (for example) a flat condition, and further for protection to the fire and rescue personnel and their equipment when contact is made therewith. For instance, it has been determined that a layer of nitryl or butyl or neoprene rubber is suitable for the above-described purposes. Laminated or adhered onto and covering the other side of the lead sheet is a tougher rubber sheet or lamination also of composition appropriate to provide protection from handling of the lead sheet. This layer will be exposed inwardly when the protective cover is in place other a sharp object, and therefore is further of suitable composition to resiliently compress as the protective cover is molded over (for example) the end of a post, to resiliently return to its uncompressed condition when the cover is removed from the post and reshaped into (for example) a flat condition. This layer is further of a tear and puncture resistant composition such a high wear rubber with an embedded scrim or other structurally reinforced rubber to withstand exposure and abrasion from contact with the jagged edges of (for example) the end of the cut post. In completion of the protective cover, the edges of the two rubber layers extend beyond the edges of the lead sheet, and are sewn together, or sealed together, or a protective coating or seal or edge is secured thereto, to seal the lead sheet entirely within the rubber layers.

Thus, the protective cover is established with a center lead sheet that is easily hand moldable, and that is laminated or and sealed within two rubber sheets of different materials specified with the above-described comparative characteristics. The lead sheet provides the foundation for the pliable, hand-moldable and shape-retention nature of the protective cover. The rubber sheets protect the lead sheet, and they protect those handling the protective cover from the lead sheet therein. In one embodiment, the lead sheet is formed as a Maltase cross, and the rubber layers are generally rectangular, with rounded corners, laminated over the lead sheet.

There has thus been outlined, rather broadly, important aspects and features of the invention in order that the detailed description thereof may be better understood, and in order that the present contribution to the art may be better appreciated. Additional features of the invention are described in the detailed description below and shown in the drawings. Before explaining the preferred embodiments of the invention in detail, it is to be understood that the invention is not limited in its application to the details of construction and to the arrangements of the components set forth in the following description or illustrated in the drawings. Instead, the invention is capable of other embodiments and of being practiced and carried out in various ways. Also, it is to be understood that the phraseology and terminology employed herein are for the purpose of the description and should not be regarded as limiting.

According, the primary objective of the invention is to provide a unique, three-part laminated pliable hand-moldable surface construction that can be utilized to achieve certain desired advantages and overcome the shortcomings of certain conventional devices.

In particular, an objective of the invention is to provide a laminated surface construction that is pliable and hand-moldable, for channeling the flow of liquids and resins, and that it will retain its shape until the particular need has been met.

Another objective of the invention is to provide a laminated surface construction that is easily shaped or molded by hand to provide the necessary channeling of all types of liquids and resins, from water to hazardous materials, generally from one location to another location.

Another objective of the invention is to provide a laminated surface construction that can cut into smaller size or shape as well as being shaped or molded by hand for establishing virtually any desired configuration by the user thus providing the means to channel liquids or resins as efficiently as possible.

Another objective of the invention is to provide a three-part laminated pliable hand-moldable surface construction that can be rolled up and stored on, for example, fire-fighting equipment and molded to a desired shape for the diversion and possible containment of both liquid and granular materials.

Another objective of the invention is to provide a three-part laminated pliable hand-moldable surface construction of a configuration that provides the ability to be manufactured with different materials which cover the lead center sheet for proper protection from various types of materials being channeled.

Another objective of the invention is to provide a surface construction protective cover that will overcome the shortcomings of the prior art extrication pads.

Another objective of the invention is to provide a surface construction for protecting rescue personnel from the dangers of injury and damage to equipment from jagged edges such as formed by the cutting off of parts of vehicles and equipment to extricate persons from the vehicle or other dangerous situations.

Another objective of the invention is to provide a surface construction for covering the sharp jagged metal edges of the A, B, C posts of vehicles and any other jagged edges to protect fire and rescue personnel and their equipment after they have cut the top off of a vehicle to get a person or persons that was trapped in the vehicle out of the vehicle.

Another objective of the invention is to provide a protective cover in a sealed unit that is safe to handle yet provides moldability to accommodate a problem at hand.

Another objective of the invention is to provide a protective cover that can be easily decontaminated and reused multiple times.

Another object of the invention is to provide a surface construction for molding into shapes as may that can be used to create other safety devices and constructions in the field.

These and other objectives and advantages of the invention will become more apparent from the following detailed description when taken in conjunction with the accompanying drawings, and it is intended that all of these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 4 is a perspective view of the surface construction as unrolled and laid flat.

FIG. 5 is a perspective view of the surface construction as shaped into a channel with one end (the left end shown) open to catch draining liquid from and the other end curled over to form a funnel or spout-type configuration suitable to guide the liquid into a container.

FIG. 6 is a perspective view of the surface construction as rolled up.

Figure 1:
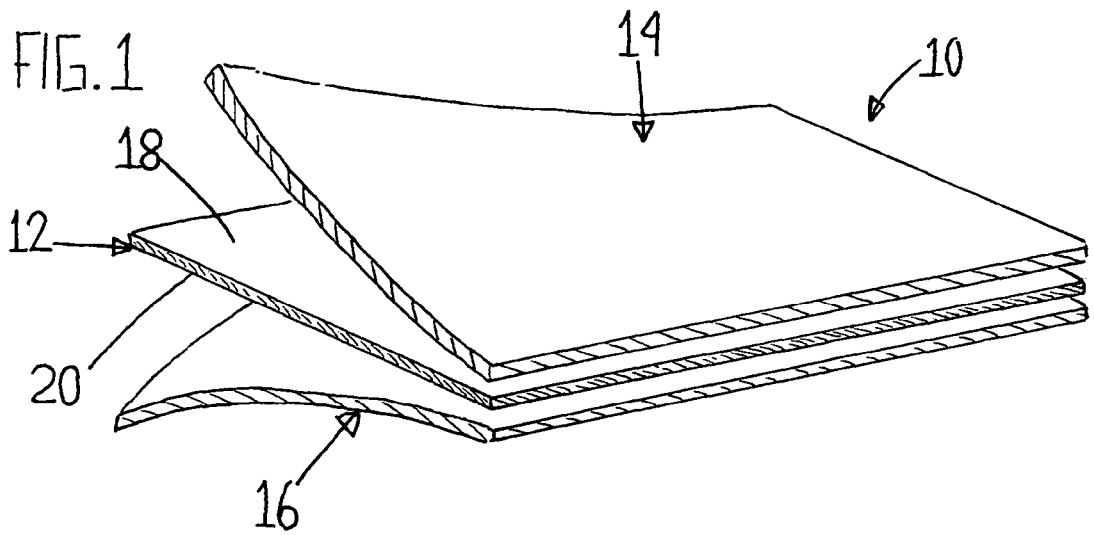
FIG. 1 is an exploded fragmentary perspective view of the three layers of a pliable hand-moldable surface construction to be laminated in accordance with the present invention.

While the invention is susceptible of various modifications and alternative constructions, certain illustrated embodiments have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE INVENTION

Turning now descriptively to the drawings, in which similar reference characters denote similar elements throughout the several views, there is shown a three-part laminated pliable hand-moldable surface construction 10 (see FIG. 4 for an overall perspective) which comprises three main layers. The center layer of the surface construction 10 is a pliable hand-moldable sheet of lead designated as item 12 (see FIGS. 1-3), both sides of which are covered with an appropriate pliable material layer 14, 16 such as thin rubber. This configuration establishes a three part laminated hand-moldable and pliable surface construction 10 which can be manually shaped to a desired configuration, optionally cut to a desired size, and is adaptable for many purposes, including but not limited to channeling the flow of liquid from one location to another, and forming a protective cover over exposed jagged edges.

More particularly, the middle layer of the surface construction 10 is a sheet of lead 12 with oppositely facing, shown as top and bottom, generally planar surfaces 18, 20 and a surrounding edge perimeter 22 that establishes a rectangular lead sheet in the embodiment shown. The lead sheet provides the structural integrity, the pliable hand-moldable characteristics, and the shape-retention characteristics of the surface construction 10 after it has been configured to a desired shape. Thus, the lead sheet functions to maintain the surface construction 10, including the outer layers 14, 16, in a desired shape and position after the surface construction has been manually shaped and placed in its operative position while in use. The lead sheet is provided in any convenient size and perimeter shape, and has a thickness of between approximately one sixty-fourth (1/64) to one-eighth (1/8) inch for hand moldability. A thickness of approximately thirty thousandths (0.03) inch or one thirty-secondth (1/32) inch is preferred for a surface construction 10 that is durable yet readily hand-moldable for use in most applications, although the thinner or thicker lead sheet will be preferred in certain instances. The trade-off in establishing a preferred thickness lead sheet for a particular use involves considerations to the additional strength and structural integrity of additional thickness verses the enhanced pliability, hand-moldability, reduced weight and ease of storage considerations with reduced thickness. Thus, the minimum thickness establishes a desired structural integrity for repeated flexing, and the maximum thickness still permits relative ease in manual shaping in accordance with the invention. The lead sheet need not be a sheet of specialized composition, but can be commercial grade lead of a composition, purity and type that is commercially available and commonly used in industry, such as in the aircraft and nuclear industries. The center layer 12 can be alternately provided from another material with similar structural, pliability and hand-moldability and shape retention characteristics as the lead sheet described.

The top sheet or layer 14 of surface construction 10 is a pliable layer that provides an operative surface for the fluid or other material being handled (i.e., channeled, guided, etc.) by the surface construction 10 or the environment (e.g., chemical or jagged edges) to which the surface construction will be exposed, and that is firmly secured to the top 18 of the center sheet 12 in a manner such that the top sheet 14 will conform to and track the exact shape of the moldable center sheet 12. The layer 14 provides protection from the lead sheet, such as protection from lead exposure due to handling of the surface construction 10, protection against possible injury while manually shaping the surface construction 10, and protection against contamination of the material as may be in contact with the surface construction 10. The layer 14 also provides protection against damage to the lead sheet such as when manually shaping and handling the surface construction 10, and from the material being guided or channeled by the surface construction 10 or the environment to which the surface construction will be exposed. The layer 14 may be further designated to provide other desired operational characteristics such as chemical resistance to the material being channeled and/or abrasive resistance for the manner in which the surface construction 10 is being used.

A preferred top layer 14 is a relatively thin rubber layer with the above-noted characteristics. In such embodiments, the composition and thickness of rubber is designated, for example, to provide protection from destruction and contamination due to exposure to sharp edges or caustic materials or harsh environments, for water-proof protection, protection against such caustic materials and environments, and like considerations. A preferred top sheet 14 of rubber further provides a reliable surface to seal over the center sheet while the surface construction 10 is being used for its intended purpose. The top sheet 14 can be alternately a pliable plastic or rubber-plastic composition or other material providing rubber-like pliability, tracking and other desired characteristics noted above, and can be provided in any desired thickness that meets these characteristics. As an example, the top layer can be provided from a sheet of neoprene rubber. In this instance, the center sheet 12 which may be made of lead is covered by the sheet 14 of neoprene rubber which is glued or otherwise laminated to the top of the center sheet 12. A layer of neoprene rubber provides desired insulative protection as well as caustic protection from certain materials that may be handled by the surface construction 10. An alternate top layer can be made from, for example, nitrile rubber, which will provide enhanced protection against certain other materials to handled by the surface construction 10. In certain preferred embodiments, neoprene and nitrile rubber thickness of approximately one thirty-secondth (1/32) inch is well suited for and provides the desired pliability and protective characteristics for the top layer 14 (as well as the bottom layer discussed below), but the thickness may decrease and increase from this while accomplishing the above-noted characteristics, which those skilled in the art will appreciate will depend on, among other factors, the flexibility and durability of the material chosen for the outer layers.

The bottom sheet or layer 16 of surface construction 10 is also a pliable layer that is firmly secured to the bottom 20 of the center sheet 12 in a manner such that the bottom sheet 16 will conform to and track the exact shape of the moldable center sheet 12. As with layer 14, layer 16 provides protection from the lead sheet, such as protection from lead exposure due to handling of the surface construction 10, and protection against possible injury while manually shaping the surface construction 10. The layer 16 also provides protection against damage to the lead sheet such as when manually shaping and handling the surface construction 10 and its use thereof.

In certain preferred embodiments, the bottom sheet 16 provides an alternate (i.e., second) operative surface such as for fluid or other material to be handled by the surface construction 10. In this instance, the bottom sheet is further designated to provide protection against contamination of such material being handled, guided or channeled by the surface construction 10, and protection from the material being handled by the surface construction 10 or the environment to which the surface construction is exposed. Such preferred layer 16 may be further designated to provide other desired operational characteristics such as chemical resistance to the material being handled by the surface construction 10 and/or abrasive resistance to the manner in which such material is being handled.

Thus, a preferred bottom layer 16 is also a relatively thin rubber layer with the above-noted characteristics. The composition of rubber is designated, for example, to provide protection from the destruction and contamination due to handling caustic materials, water-proof protection, and protection against such caustic materials or environment to which the surface construction may be exposed. A preferred bottom sheet 16 of rubber further provides a reliable surface to seal the center sheet 12 while materials are being handled by or in contact with the surface construction 10, such as while liquids or resins are being channeled from a drain port to a container. The bottom sheet 16 can be alternately a pliable plastic or rubber-plastic composition or any material providing similar pliability, tracking and other desired characteristics such as noted above, and can be provided in any desired thickness that meets these characteristics.

Therefore, the bottom layer 16 may be of the same composition and thickness, to obtain the same functional characteristics as the top layer 14, so that use of either the top layer or the bottom layer as the operative layer for handling the desired material is interchangeable in, for example, a flow channeling device. Alternately, the bottom layer may be of a different composition and/or thickness than the top layer to obtain different functional and protection characteristics. In such instance, the surface construction 10 will provide two alternate operative surfaces for handling materials that require different protective characteristics. For example, as is well known, different rubber compositions are better able to resist degradation against different liquids. A surface construction 10 with different top and bottom rubber composition layers will be able to better resist surface material degradation against liquids with two such different characteristics. In this instance, the top and bottom layers will be distinguishable to the user by (two) distinct indicia such as visually different markings on the top and bottom layers, different colored stripes, different surface textures, or different overall colors.

The surface construction 10 can be produced using any suitable method and fabrication technique, which method and technique may also contribute the resulting thickness of the top and bottom layers. According to a currently preferred method of fabricating surface construction 10, a center sheet 12 is cut to a desired size and perimeter shape, and the top and bottom layers are cut to approximately the same shape and larger in size than the center sheet. The pre-cut top and bottom layers 14, 16 are then laminated to the top and bottom surfaces 18, 20 of the center sheet, with the perimeters of the top and bottom layers extend beyond the perimeter of the center sheet, utilizing an adhesive that is suitable for material compositions of all three layers. To effect lamination of the layers, contact cement or other adhesive is spread or sprayed over the surfaces of the three layers to be adhered together. The layers are then assembled together into the surface construction 10 and held in place until the adhesive is set. If the perimeters of the top and bottom layers are not initially identical or are not aligned in the assembled surface construction 10, then a trimming process can be utilized to establish the outer perimeter of the surface construction 10 with the aligned, adhered outer perimeters of the top and bottom layers extending beyond the perimeter of the center sheet and adhered together to establish an outer rubber lip or surrounding perimeter 24 (see e.g., FIGS. 3-4). The result will be a laminated three part sheet of pliable surface construction that can be molded or cut into any shape for a custom application.

A method for fabricating the surface construction 10 will optionally include sewing the perimeters 24 of the top and bottom layers 14, 26 together (around the edges thereof), or otherwise reinforcing the adhesively secured perimeters of the top and bottom layers for additional resistance against separation during use. According to an alternate method of fabricating surface construction 10, a center sheet 12 is cut to a desired size and perimeter shape, and is over-sprayed with a rubberized (or other suitable) composition to develop the layers 14 and 16 adhered thereto, with subsequent drying, curing, vulcanizing, etc., and trimming as applicable, to establish the surface construction 10. According to another alternate method of fabricating surface construction 10, a center sheet 12 is cut to a desired size and perimeter shape, and is then dipped in a rubberized (or other suitable) composition to develop the layers 14 and 16 adhered thereto with subsequent drying, curing, vulcanizing, etc., and trimming as applicable, to establish the surface construction 10. All of the above-described methods of producing surface construction 10 will enable provision a the preferred rubber perimeter 24 surrounding the perimeter 22 of the center sheet 12.

Figure 2:
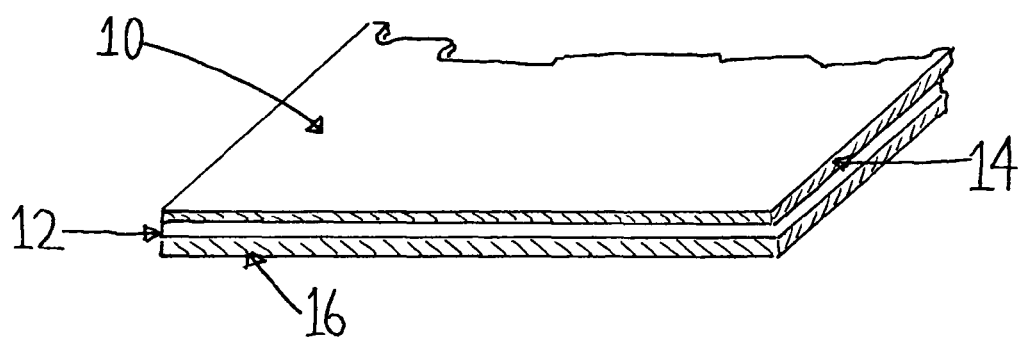
FIG. 2 is a fragmentary perspective view of the surface construction showing the center and outer layers laminated together.
Figure 3:
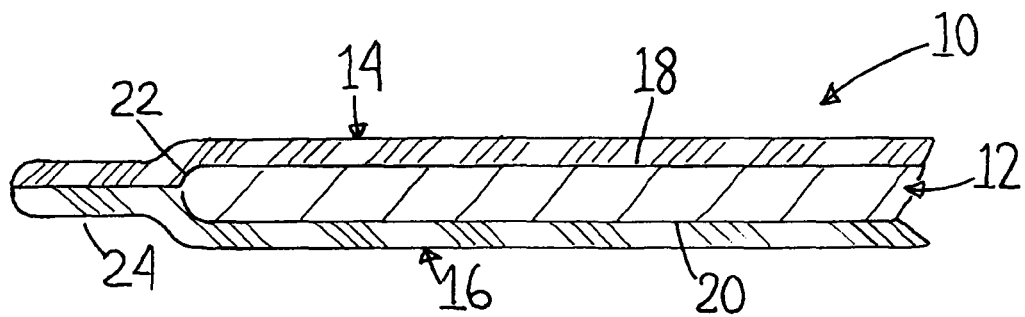
FIG. 3 is a fragmentary cross-section of an edge portion of the surface construction.
Figure 7:
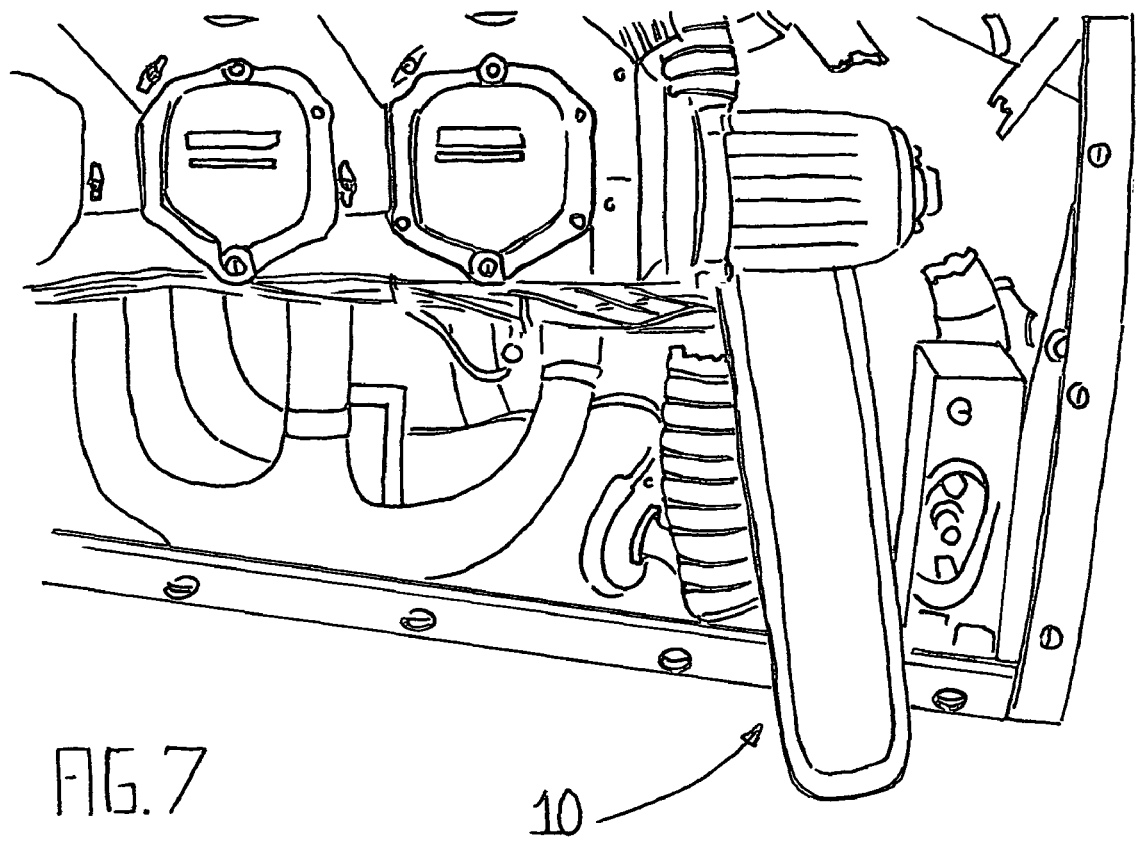
FIG. 7 is a front perspective view of the surface construction as formed into a channel (similar to shown in FIG. 5) and positioned into and draining oil from an aircraft engine with a drain port that is not easily accessible with conventional oil draining devices due to obstructing elements of the engine.

In yet another method of fabricating surface construction 10, larger material sheets of the center and top and bottom layers are adhered together to produce large laminated sheets that are cut into individual surface constructions 10. This procedure results in edges of the center sheet of each surface construction 10 being exposed (as shown in FIG. 2). However, such surface constructions 10 may suitable for use, without concern for exposed lead edges in certain instances, such as where exposure of the lead sheet edges does not present a safety hazard or other concern, or where the surface constructions 10 are packaged or stored for one-time use, when the lead edges of the surface construction 10 are covered or protected in another manner, or when the center sheet is made from a material other than lead but with the pliability, moldability and other above-noted characteristics of lead. Such surface constructions can alternately be further processed to provide a protective edge covering over the otherwise exposed lead sheet edges such as to spray on a protective edge of rubber, or adhere a protective rubber edge to the construction.

With the foregoing arrangement, the surface construction 10 will achieve all of the objectives and advantages of the invention as discussed herein. Briefly, these include provision of a durable, hand moldable device that can be shaped in all manner of configurations to, for example, channel material from difficult to reach places, and along inconvenient paths, or to mold over jagged edges as a protective covering. When not in use, the surface construction can be unrolled and laid flat (FIG. 4) or rolled up (FIG. 6) for convenient storage.

For fluid channeling purposes, the surface construction 10 may be provided in rolls of different material and thickness. For aviation uses, the surface construction will provide the ability to customize a gutter like channel to guide oil from the oil filter as it is being drained from an engine with a difficult to reach drain port. In this instance, an appropriate sized surface construction can be rolled up and carefully inserted into the engine compartment and molded into the shape and channel needed to provide the proper exiting of oil as the filter and engine drains once the old filter has been removed. The oil filter can be allowed to drain onto the surface construction as well as the internal portion of the engine in which the filter or filters has just been removed. The oil is guided along the channel established by the surface construction between engine parts to provide a more efficient exit to the containment device such as a bucket.

Figure 8:
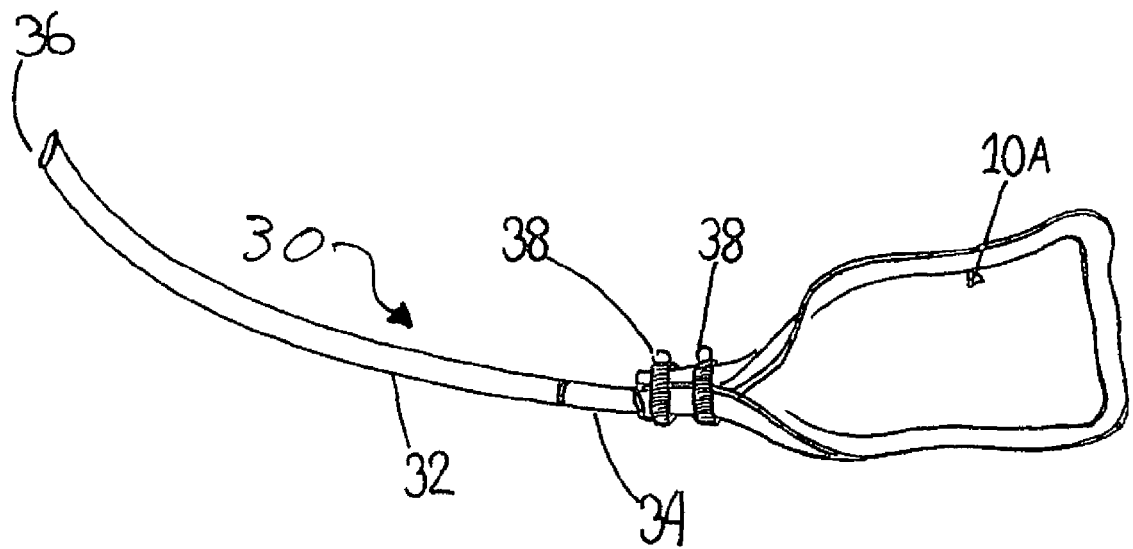
FIG. 8 is a perspective view of an oil draining device comprising a laminated surface construction with a discharge end clamped to one end of a tube.

For additional fluid channeling purposes, the surface construction 10 can be used, for example, by the fire fighting industry for caustic chemical containment, where an on-the-spot hand-moldable surface construction must be created to protect personnel, equipment or the environment. Holes can be cut into the surface construction and/or a drain device attached to provide a specially designed funnel which is pliable and will conform to a location in which a standard funnel would not work. As a further example, a fluid draining device 30 shown in FIG. 8 comprises a surface construction 10A and a rubber tube 32 with an inlet end 34 and a discharge end 36. The surface construction is configured into a funnel-shaped open channel, with a generally open upper end and a restricted-flow lower end that curves or wraps around into a circumferentially closed discharge port, and is secured around the inlet end of the tube, such as with an adhesive for a permanent connection or with clamps 38 for a removable connection. The moldable funnel 30, by virtue of the flexible discharge tube, enables the draining of oil or other liquid along extremely curved or very small paths between fixed elements of the engine or machine being worked on.

The surface construction 10 can also be used for a unique flow containment, channeling and patching system for both hazardous and non hazardous materials. As an example, if there were a leak in a pipe, the surface construction could be wrapped the pipe to the left or right of the leak and wire ties installed which are ready to be tightened. The surface construction and ties would then be slide over the leak and the ties tightened to provide a temporary seal which would contain the spray from the leak and substantially slow the flow of liquid or gas to a safer level. The liquids could then be optionally diverted with the end portion of the surface construction shaped to direct the liquid to a container by unrolling more of the surface construction and creating a custom channel at the end for the diverting of the leak to the container. A larger size surface construction made out of appropriate material and thickness to accommodate the liquid or resin being channeled can be used as an outside diversion mat to help control the flow of liquids or resins such as hazardous materials, such as from a leaking barrel to a receiving container located downhill from the barrel.

In the plumbing industry, the surface construction 10 provides a moldable channel to divert a leak of water from a pipe to a container, for instance under the sink in which it is often hard to manage a leak. The surface construction will be unrolled and custom shaped for the configuration required, such as to channel around pipes and other obstructions between the leak and the container. In the machine tool industry, the surface construction can be used for a coolant diversion device which can be remolded for any particular circumstance to divert the spray and contain the coolant to the proper location in which the coolant was required. The surface construction can also be used as a mechanics mat which can be of any manageable size on a workbench to provide a unique mat system to contain and divert liquids as they are draining from mechanical devices while they are being disassembled. The edges can be hand molded to the shape desired to contain or divert the liquids which are leaking or draining from the parts or devices as they are being disassembled. Due to the base lead sheet of the surface construction 10, the surface construction can be used for its inherent spark resistant characteristic, in that is will not cause sparks in dangerous situations while installing it such as a patch on a leak of ignitable or potentially explosive liquid. The surface construction can also be used to "channel" or control the flow of non-liquid materials, such as to divert manufactured or molded parts into containers as they are ejected from or come off the machines.

Figure 10:
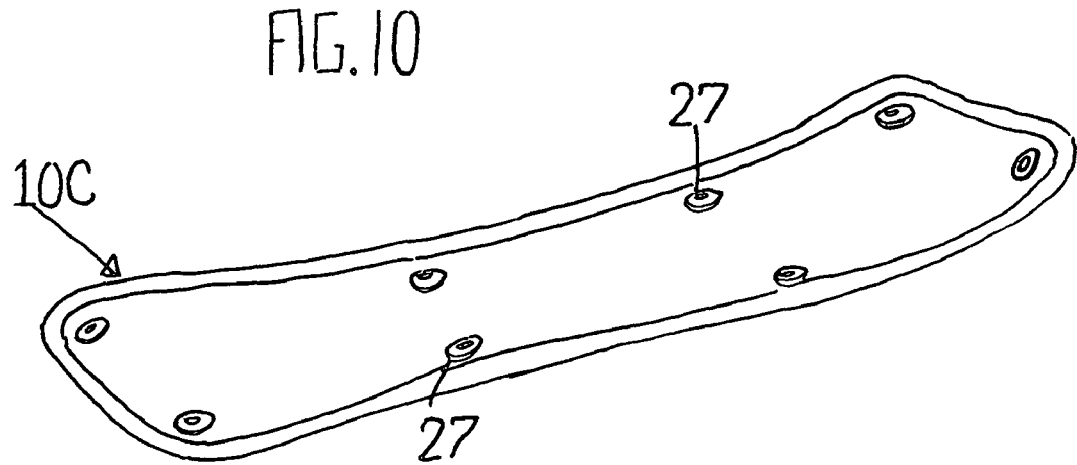
FIG. 10 is a perspective view of an alternate surface construction provided with grommets.
Figure 9:
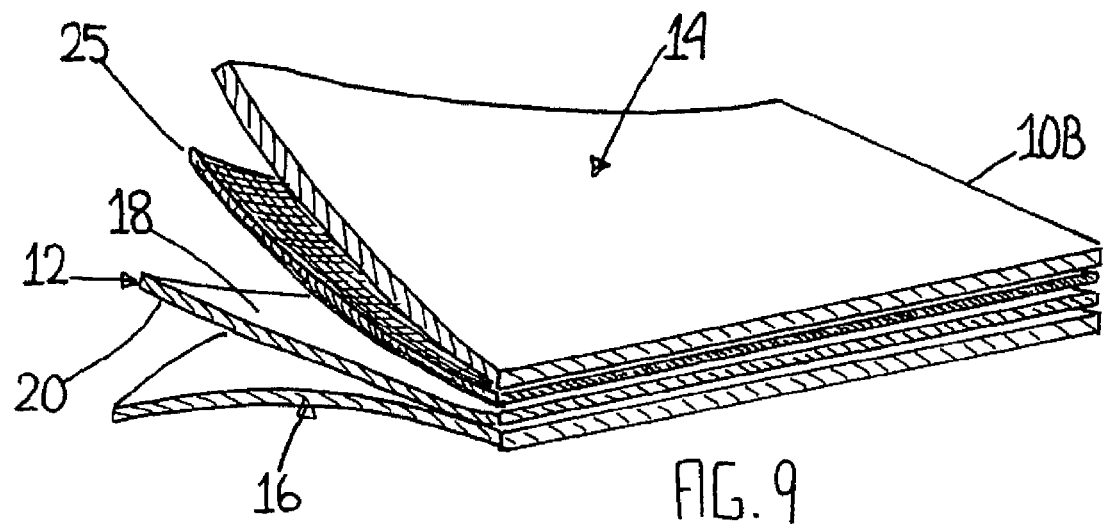
FIG. 9 is a view similar to FIG. 1 of an alternate surface construction with a Kevlar layer.

Due to the unique moldable construction and base lead sheet of the surface construction in accordance with the invention, it can also be used as a flexible protective mat-type device. For example, in an alternate embodiment shown in FIG. 9, a layer of pliable Kevlar 25 is added to the laminated surface construction 10. The resulting surface construction 10A has the ability to be molded into a desired shape to provide a unique utility of strength and moldability to a specific circumstance, such as to be used as a protective puncture resistant and radiation resistant product. In another alternate embodiment shown in FIG. 10, grommets 27 are installed near the edges of the surface construction 10B, with the laminated Kevlar layer optionally provided, to obtain a pliable, moldable tarp-like surface construction which then could be laced with Kevlar or other rope through the grommets and pulled tight and tied off in a desired location or around a desired object, such as a fuel storage drum or the like for containment and protection against moderate events in the field. As will be evident from the foregoing, the laminated pliable hand-moldable surface construction in accordance with the invention will be useful in numerous embodiments and for many uses.

Figure 11:
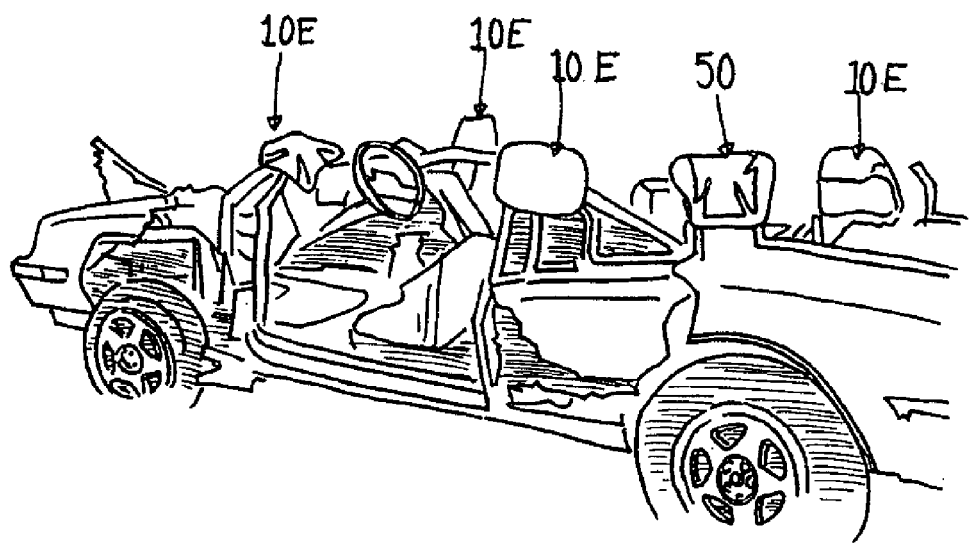
FIG. 11 is a perspective view showing use of a surface construction as a protective cover over jagged edges and sharp objects on a car whose top has been removed by rescue personnel.

In accordance with another aspect of the invention, a three-part laminated pliable hand-moldable surface construction is provided as a protective cover or extrication pad, for positioning over jagged edges and sharp objects such as on a vehicle whose top has been removed by rescue personnel. As shown in FIG. 11, the protective cover may be provided in the form of surface construction 10E similar to surface 10 described above, but in a generally wider or larger size as would typically be used for oil draining or flow channeling purposes. However, in a preferred embodiment, the protective cover is uniquely configured for ease of wrapping over such jagged posts and sharp objects. One such preferred protective cover 50 is shown in perspective in FIG. 12, and in an exploded perspective view in FIG. 15. The protective cover 50 comprises three main layers to establish a uniquely configured three-part laminated pliable hand-moldable surface construction with sealed edges as generally described above. The center layer of the protective cover is a pliable hand-moldable sheet of lead 52 cut into a suitable shape, and provides the ability to retain the shape of the cover after it is mold over a sharp object. One side 54 (typically the top side) is a layer of soft rubber of suitable composition which allows the cover to seal in the center layer yet stretch as the cover is molded over the sharp object. The opposite side 56 (typically the bottom side) is the layer which will bear against the jagged edges of the object over which the cover is molded, and is a tougher layer of high-wear rubber which is resistant to withstand abrasion and puncture from sharp objects and. The edges of the rubber layers are sealed together, to seal the lead in between the layers of rubber and thereby provide protection from handling the lead sheet. This construction provides a protective cover, in accordance with the invention, which can be manually molded around the top of a post or other object that may have jagged edges or sharp protrusions.

Figure 12:
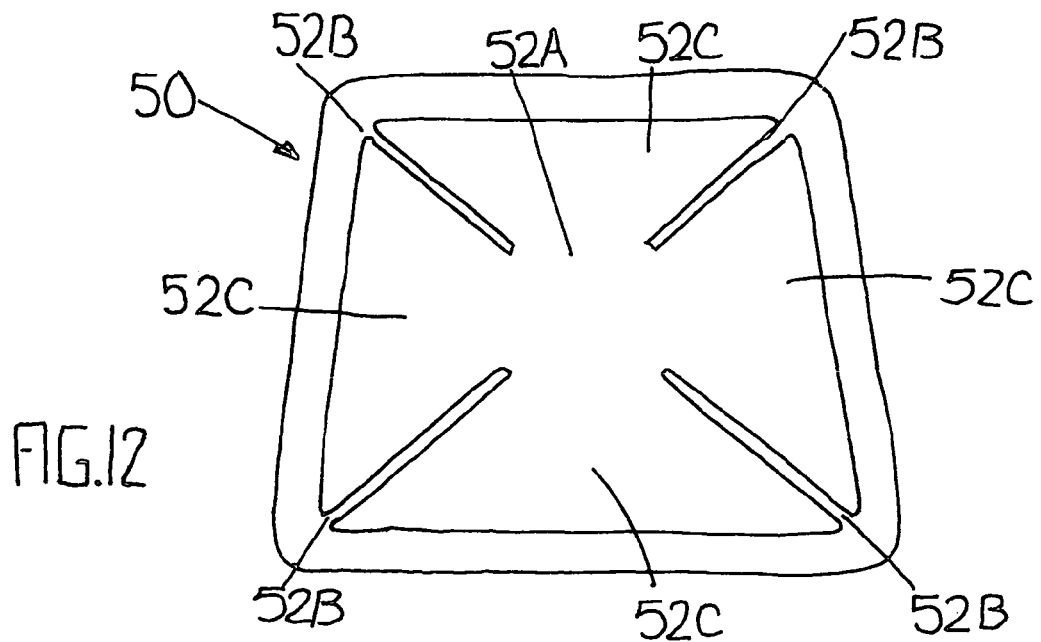
FIG. 12 is a perspective view of a preferred embodiment protective cover in accordance with another aspect of the invention.
Figure 14:
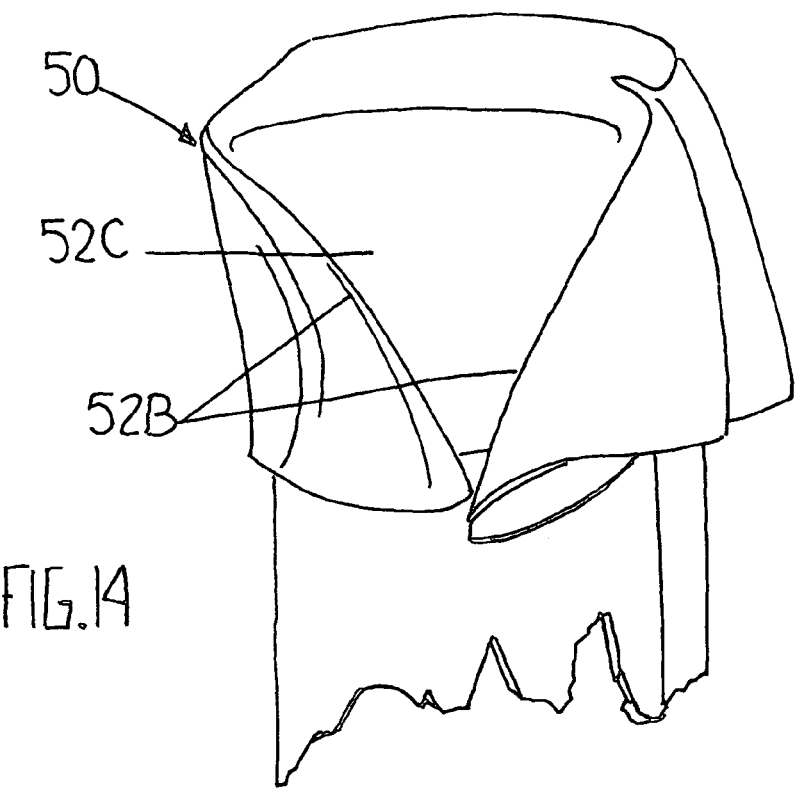
FIG. 14 is a perspective view of the protective cover with the edge portions of the flaps folded snugly around the post.
Figure 15:
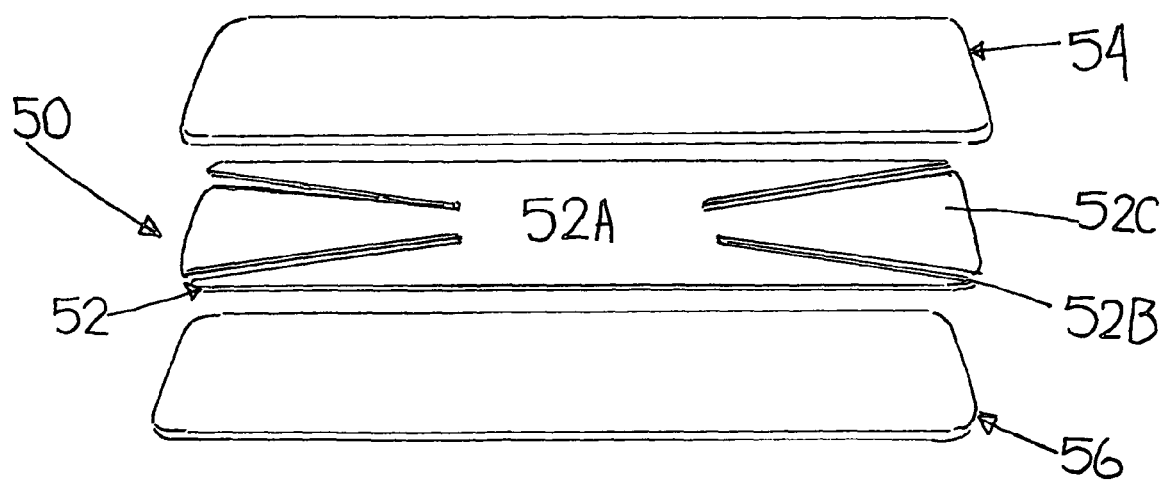
FIG. 15 is an exploded perspective view of the protective cover, the cover comprising a top layer of a softer rubber-like nitryl or neoprene rubber, a center layer of pure lead which can be in different shapes, and a bottom layer of a rubber which is tougher high wear resistant rubber.

As shown in FIGS. 12 and 15, the center lead layer 52 of the protective cover 50 is formed with a center material part 52A, and an outer material part that includes an outer edge formed with slots or slits 52B or other configured material voids to establish flaps 52C or other configured material parts. One suitable cut configuration for the lead sheet is a Maltese cross shape, or a generally rectangular center layer with corner slits shown in FIG. 12-15.

The top sheet or layer 54 of protective cover 50 is a soft, pliable layer that provides a soft, protective outwardly exposed surface when the cover is molded in place over the end of a post or other sharp object, for protection to the rescue personnel and their equipment when contact is made therewith. The top layer is firmly laminated, adhered or otherwise secured to the center lead sheet, covering the entire lead sheet and extending beyond its edges. The top layer is of suitable composition to resiliently stretch as the protective cover is molded over the sharp object, and to resiliently return to its unstretched condition when the cover is removed from the post and reshaped into, for example, a flat condition. The top layer provides protection from lead exposure when handling the lead sheet in the protective cover, and protection against possible injury while manually shaping the protective cover. The layer may be further designated to provide other desired operational characteristics such as chemical resistance. For instance, it has been determined that a layer of nitryl or neoprene rubber is suitable for the above-described purposes.

Laminated or otherwise secured onto and covering the other side of the lead sheet 52 is a tougher rubber sheet 56 or lamination also of composition appropriate to provide protection from handling of the lead sheet. This layer will be exposed inwardly when the protective cover is in place over the end of a post or other sharp object, and therefore is further of suitable composition to resiliently compress as the protective cover is molded over the object, to resiliently return to its uncompressed condition when the cover is removed from the post and reshaped into, for example, a flat condition. This layer is further of a tear and puncture resistant composition such a high wear rubber with an optional embedded scrim such as flexible fiberglass strands or para-aramid synthetic fiber (Kevlar)* strands or other structurally reinforced rubber to withstand exposure and abrasion from contact with the jagged edges of the end of the cut post or other sharp object over which the surface construction is conformed.

To complete the protective cover 50, the edges of the two rubber layers 54, 56 extend beyond the edges of the lead sheet, and are sewn, glued, welded, or otherwise sealed together, or a protective coating or seal or edge is secured thereto, to seal the lead sheet entirely within the rubber layers.

Figure 13:
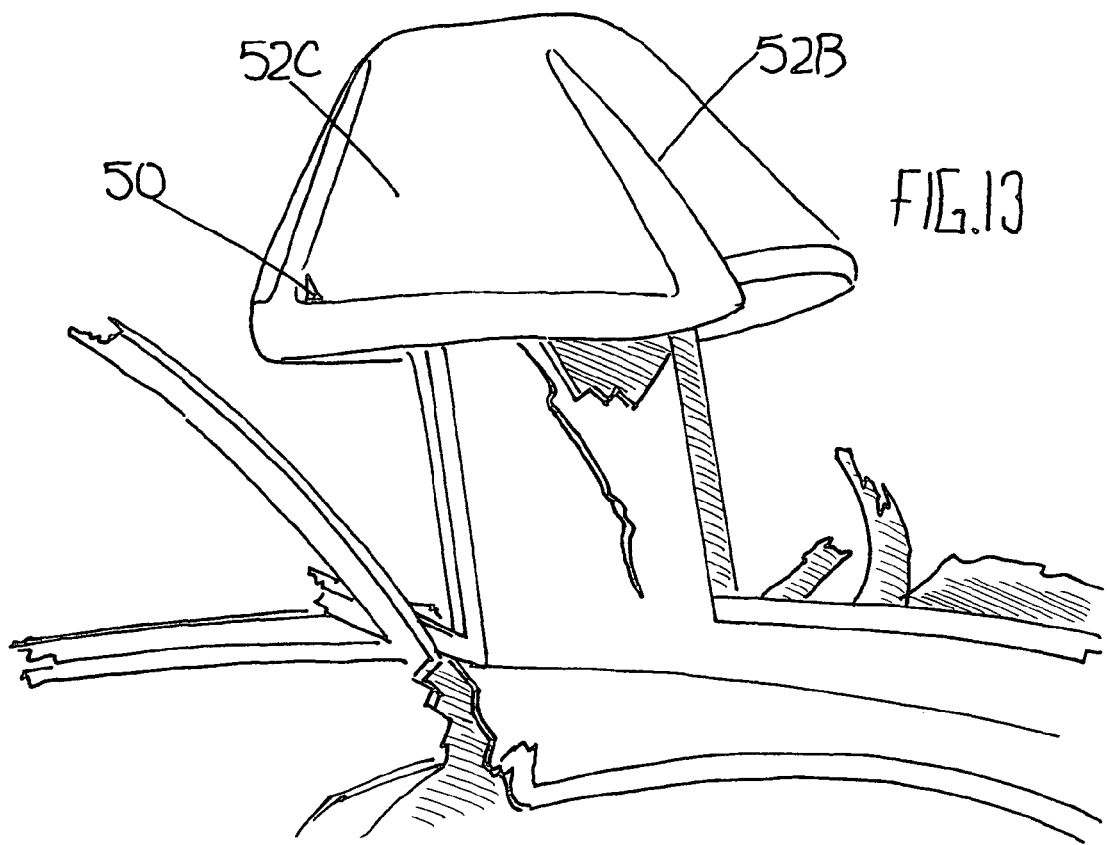
FIG. 13 is a perspective view of the protective cover, as initially positioned onto and covering the end of a post such as might have sharp edges, with the center material part over the top of the post and the flaps folded snugly down onto the sides of the post.

In use, the center of the protective cover, corresponding to the center material part 52A of the lead sheet, is placed over the jagged exposed end of a post or other object, and the flaps are bent or folded snugly around the wall of the post or object such as shown in FIG. 13. The slots or cut-outs in the lead sheet enable the rubber layers corresponding thereto to naturally fold outwardly as the flaps are fold down onto the post. To further ensure that the protective cover will remain in place until manually removed, adjacent the edge portions of the flaps are then folded towards one another, snugly around the post as shown in FIG. 14, where the protective cover will remain, retaining its molded shape until manually reshaped and removed from the post.

Protective covers 50 as fire fighters would use would have many convenient sizes, but for instance, the size covering a "B" post of a vehicle which has been cut off would typically be approximately 18×18 inches and would be taken and placed over the cut surface and molded over that surface to the shape of the post. This provides a protective layer which protects the fire fighters, and their equipment, as well as the victim while being removed from the vehicle. The tough bottom rubber layer is the first line of protection against the jagged metal edges while the center lead layer which serves two basic purposes: to provide the cover with its shape retention capability and hold secure to the post, and to provide a second line of defense against the sharp jagged material left after the posts are cut. The top, softer layer or rubber provides the ability to seal the lead in, and keep the environment away from the center layer of lead. The rubber layers also provide the ability for the protective cover to be decontaminated of bodily fluids and other foreign materials such as with bleach water. Thus, the protective cover protects the people who are working in and around the vehicles from the hazards created by the same people cutting the top of the vehicle off to save the victim.

As shown, the center sheet 52 of the surface construction 50 is generally rectangular (square as shown) to correspond with the perimeter of the outer rubber layers 54, 56, thereby reducing the lip surrounding the center sheet to approximately one-fourth inch, with the rubber edges at the lip being sewn together continuously around the perimeter to further preclude separation of the lamination during extended use.

Other use of the surface construction and protective cover in accordance with the invention will include as a decontamination tray rail which can be unrolled and shaped into v-like shape to provide a decontamination tray, and rolled back up or stored flat. A large decon tray that fits into a ladder of a fire fighting vehicle for example would be 12 feet by 16 inches long and fit down between the ladder rails and supported by the rungs of the ladder. Grommets as described above may be provided in the protective cover for additional hold-down purposes, or, for example, magnets can be secured between the layers of the cover for additional holding power as the cover is mold into custom shapes over steel and other magnetic objects. The invention can also be used as patch material, as a first line protection against acid spills, in all sizes and shapes with a sealed edge. For example, a technique to contain leaking acid and other hazardous materials in, for example, a tanker, that comprises providing a three-part laminated protective cover or surface construction of a lead center layer and outer rubber protective layers with sealed edges and sized to wrap substantially around the tank and at least substantially beyond the boundaries of the leaking area of the tank; and securing the laminated cover over the leak with an outer stainless steel sheet and compression band(s) that extend around the tanker.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

From the foregoing, it will be apparent that the present invention brings to the art a new and unique laminated pliable surface construction that can be hand shaped for many uses. The surface construction is suited to be used as a diversion device in which a liquid or resin could be diverted, the surface construction being hand molded into a appropriate shape to provide a channel or funnel-shape for the material to be diverted to the appropriate container. The surface construction is a device which can be rolled out and molded into a channel to divert a spill or liquid or resin and provide a excellent option to get the liquids to an appropriate container and thereby protect surrounding equipment, parts, etc., from the effects of contamination by the liquid. The surface construction is also suited to be used as a protective cover or extrication pad over sharp edges such as to which rescue personal may be exposed. The unique construction of pliable, hand-moldable lead sheet laminated over with rubber sheets accomplishes these and other purposes.

The invention claimed is:

1. A pliable surface construction comprising:
a layer comprising a pliable hand-moldable sheet having oppositely facing surfaces and a perimeter edge;
a layer of a pliable sheet covering each of said oppositely facing surfaces,
wherein said pliable hand-moldable sheet has shape-retention characteristics to retain said surface construction in the shape into which it is molded, wherein said covering layers of pliable sheet covering each of said oppositely facing surfaces are larger in size than said hand-moldable sheet and extend beyond said perimeter edge thereof, said covering layers are adhered together beyond said perimeter edge to form a lip surrounding said perimeter edge of said hand-moldable sheet.

2. A pliable surface construction as claimed in claim 1 wherein said pliable hand-moldable sheet can be reshaped after it is hand-molded into a shape.

3. A pliable surface construction as claimed in claim 2 wherein said hand-moldable sheet is generally rectangular and can be shaped into an elongated channel which is curved or bent in three dimensions to form a flow channeling device to channel flow between two locations and after use can be reshaped, including rolled or flattened for storage.

4. A pliable surface construction as claimed in claim 1 wherein said pliable hand-moldable sheet is made of lead.

5. A pliable surface construction as claimed in claim 4 wherein said covering layers are made of rubber.

6. A pliable surface construction as claimed in claim 5 wherein said covering layers are selected from the group consisting of neoprene rubber, butyl rubber and nitril rubber.

7. A pliable surface construction as claimed in claim 5 wherein each said covering layer is made of the same material.

8. A pliable surface construction as claimed in claim 5 wherein each said covering layer is made from a different material.

9. A pliable surface construction as claimed in claim 1 wherein said pliable hand-moldable sheet is generally rectangular and has a thickness of between one sixty-fourth inch (1/64") to one-eighth inch (1/8").

10. A pliable surface construction as claimed in claim 9 wherein said pliable hand-moldable sheet has a thickness of about thirty thousandths of an inch (0.030").

11. A pliable surface construction as claimed in claim 10 wherein said covering layers have a thickness of about one thirty-second inch (1/32").

12. A pliable surface construction as claimed in claim 1 wherein said hand-moldable sheet is generally rectangular and said lip extends at least one quarter inch (1/4") from said perimeter edge.

13. A pliable surface construction as claimed in claim 1 wherein said layer of pliable hand-moldable sheet includes a center material part and an outer material part having configured voids establishing flaps.

14. A pliable surface construction as claimed in claim 13 wherein said material voids are slots.

15. A pliable surface construction as claimed in claim 14 wherein said center material part and outer material part define a Maltese cross shape.

16. A pliable surface construction as claimed in claim 14 wherein said covering layers are adhered to each other within said configured voids.

17. A pliable surface construction as claimed in claim 13 wherein said layer of pliable hand-moldable sheet is generally rectangular and includes corner slits.

18. A pliable surface construction as claimed in claim 13 wherein one of said covering layers is a soft pliable layer and the other of said covering layers is a tear and puncture resistant rubber layer.

19. A pliable surface construction as claimed in claim 18 wherein said tear and puncture resistant layer is a high wear rubber with embedded scrim.

20. A pliable surface construction as claimed in claim 19 wherein said scrim comprises strands selected from the group consisting of flexible fiberglass strands and strands of para-aramid synthetic fiber.

21. A pliable surface construction comprising:
a layer comprising a pliable hand-moldable sheet having oppositely facing surfaces and a perimeter edge;
a layer of a pliable sheet covering each of said oppositely facing surfaces,
wherein said covering layers are adhered to said oppositely facing surfaces of said hand-moldable sheet,
wherein said layers of pliable sheet covering each of said oppositely facing surfaces are larger in size than said hand-moldable sheet and extend beyond said perimeter edge thereof, said covering layers are adhered together beyond said perimeter edge to form a lip surrounding said perimeter edge of said hand-moldable sheet.

22. A pliable surface construction as claimed in claim 21 wherein said pliable hand-moldable sheet has shape-retention characteristics to retain said surface construction in the shape into which it is molded.

23. A pliable surface construction as claimed in claim 22 wherein said pliable hand-moldable sheet can be reshaped after it is hand-molded into a shape.

24. A pliable surface construction as claimed in claim 23 wherein said hand-moldable sheet is generally rectangular and can be shaped into an elongated channel which is curved or bent in three dimensions to form a flow channeling device to channel flow between two locations and after use can be reshaped, including rolled or flattened for storage.

25. A pliable surface construction as claimed in claim 24 wherein said pliable hand-moldable sheet is made of lead.

26. A pliable surface construction as claimed in claim 25 wherein said covering layers are made of rubber.

27. A pliable surface construction as claimed in claim 26 wherein said covering layers are selected from the group consisting of neoprene rubber, butyl rubber and nitril rubber.

28. A pliable surface construction as claimed in claim 27 wherein each said covering layer is made of the same material.

29. A pliable surface construction as claimed in claim 27 wherein each said covering layer is made from a different material.

30. A pliable surface construction as claimed in claim 21 wherein said hand-moldable sheet is generally rectangular and said lip extends at least one quarter inch (¼") from said perimeter edge.

* * * * *